(12) United States Patent
Katanoda

(10) Patent No.: US 10,821,842 B2
(45) Date of Patent: Nov. 3, 2020

(54) ELECTRIC VEHICLE

(71) Applicant: TOYOTA JIDOSHA KABUSHIKI KAISHA, Toyota (JP)

(72) Inventor: Tomoya Katanoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 16/229,770

(22) Filed: Dec. 21, 2018

(65) Prior Publication Data

US 2019/0193579 A1 Jun. 27, 2019

(30) Foreign Application Priority Data

Dec. 26, 2017 (JP) .................................. 2017-249373

(51) Int. Cl.
*B60L 50/60* (2019.01)
*B60L 50/51* (2019.01)
*B60L 58/13* (2019.01)

(52) U.S. Cl.
CPC ............... *B60L 50/60* (2019.02); *B60L 50/51* (2019.02); *B60L 58/13* (2019.02); *B60L 2210/40* (2013.01); *B60L 2240/622* (2013.01)

(58) Field of Classification Search
CPC ........... B60L 2210/40; B60L 2240/622; B60L 50/51; B60L 50/60; B60L 58/13
USPC ........................................................ 701/22
See application file for complete search history.

(56) References Cited

U.S. PATENT DOCUMENTS

| 6,507,127 | B1* | 1/2003 | Amano | B60W 10/06 |
| | | | | 290/40 C |
| 7,849,944 | B2* | 12/2010 | DeVault | B60K 6/46 |
| | | | | 180/65.29 |
| 8,639,409 | B2* | 1/2014 | Ramaswamy | H02J 3/06 |
| | | | | 701/31.5 |
| 8,718,843 | B2* | 5/2014 | Kubota | B60W 10/26 |
| | | | | 701/22 |
| 9,126,493 | B2* | 9/2015 | Suganuma | B60L 53/30 |
| 9,126,585 | B2* | 9/2015 | Takizawa | B60K 6/445 |
| 9,428,076 | B2* | 8/2016 | Fleming | G06F 19/00 |
| 9,469,289 | B2* | 10/2016 | Yu | B60W 10/06 |
| 9,834,199 | B2* | 12/2017 | Yoon | B60W 20/12 |
| 10,112,728 | B2* | 10/2018 | Evans | B60L 53/124 |
| 2002/0062183 | A1* | 5/2002 | Yamaguchi | B60K 6/543 |
| | | | | 701/22 |

(Continued)

FOREIGN PATENT DOCUMENTS

| JP | 10-051906 A | 2/1998 | |
| JP | 2011-193547 A | 9/2011 | |
| JP | 2017210040 A * | 11/2017 | ............ B60W 10/26 |

*Primary Examiner* — Angelina Shudy
(74) *Attorney, Agent, or Firm* — Sughrue Mion, PLLC

(57) ABSTRACT

An object is to increase the possibility that an electric vehicle is able to reach an operating charging facility. There is provided an electric vehicle comprising: a motor for driving; a power storage device configured to transmit electric power to and from the motor; and a control device configured to control the motor and to set a first rate to a controlling lower limit rate of the power storage device. When it is expected that the electric vehicle is unable to reach an operating charging facility which is a charging facility in service, with keeping the controlling lower limit rate to the first rate, the control device changes the controlling lower limit rate to a second rate that is lower than the first rate.

5 Claims, 2 Drawing Sheets

(56) References Cited

U.S. PATENT DOCUMENTS

| | | | |
|---|---|---|---|
| 2008/0262667 A1* | 10/2008 | Otabe | B60W 10/26 701/22 |
| 2009/0101421 A1* | 4/2009 | Oyobe | B60L 53/24 180/65.29 |
| 2010/0268438 A1* | 10/2010 | Hiranuma | F02D 41/0235 701/102 |
| 2010/0305798 A1* | 12/2010 | Phillips | B60W 40/09 701/22 |
| 2012/0098502 A1* | 4/2012 | Hori | B60L 15/2009 320/162 |
| 2012/0109472 A1* | 5/2012 | Yanagisawa | B60L 50/61 701/50 |
| 2012/0306446 A1* | 12/2012 | Suganuma | B60L 58/15 320/109 |
| 2013/0226389 A1* | 8/2013 | Yamazaki | B60W 10/08 701/22 |
| 2014/0067660 A1* | 3/2014 | Cornish | B60L 55/00 705/39 |
| 2014/0111145 A1* | 4/2014 | Mitsuda | B60W 10/26 320/107 |
| 2015/0039391 A1* | 2/2015 | Hershkovitz | G06Q 30/0202 705/7.31 |
| 2015/0165915 A1* | 6/2015 | Cun | B60L 53/68 320/101 |
| 2015/0298565 A1* | 10/2015 | Iwamura | B60L 58/12 701/22 |
| 2016/0006282 A1* | 1/2016 | Winkler | H02J 7/00036 320/150 |
| 2016/0352139 A1* | 12/2016 | Takatsu | H02J 7/025 |
| 2017/0120888 A1* | 5/2017 | Jinno | B60W 20/00 |
| 2017/0334429 A1* | 11/2017 | Takizawa | B60K 6/442 |
| 2017/0361837 A1* | 12/2017 | Morisaki | B60W 10/30 |
| 2018/0072170 A1* | 3/2018 | Evans | B60L 53/126 |
| 2018/0141458 A1* | 5/2018 | Jammoul | B60L 58/27 |
| 2018/0170194 A1* | 6/2018 | Ichikawa | B60W 10/08 |
| 2018/0229859 A1* | 8/2018 | Evans | H02J 7/0044 |
| 2019/0126769 A1* | 5/2019 | Schmalzried | B60L 53/64 |
| 2019/0168736 A1* | 6/2019 | Morisaki | B60W 10/06 |
| 2019/0207180 A1* | 7/2019 | Richter | B60L 50/16 |
| 2019/0260217 A1* | 8/2019 | Sone | B60L 58/20 |
| 2019/0329758 A1* | 10/2019 | Takahashi | B60W 20/12 |
| 2020/0160461 A1* | 5/2020 | Kaniki | G06Q 30/0206 |

* cited by examiner

ELECTRIC VEHICLE

CROSS-REFERENCE TO RELATED APPLICATION

This application claims priority to Japanese Patent Application No. 2017-249373 filed on Dec. 26, 2017, the contents of which is incorporated herein by reference.

TECHNICAL FIELD

The present disclosure relates to an electric vehicle.

BACKGROUND

A proposed configuration of an electric vehicle includes a power storage device, a load group that includes a motor for driving and that receives electric power supplied from the power storage device, a charger that is connected with the power storage device and that is connected with a vehicle exterior charging facility (as described in, for example, JP 2011-193547A). When the current state of charge of the power storage device enables the electric vehicle to reach a main charging facility that is nearest to a current location of the electric vehicle and a sub charging facility other than the main charging facility, in an ordinary drive mode, the electric vehicle maintains or increases a drive mode changeover variable. When the electric vehicle is unable to reach at least one of the main charging facility and the sub charging facility in the ordinary drive mode, the electric vehicle decreases the drive mode changeover variable. The electric vehicle then controls the load group corresponding to a power-saving drive mode that is set to decrease the amount of power consumption of the load group per unit driving distance in a stepwise manner with a decrease in the drive mode changeover variable. This reduces the risk that the vehicle falls into the state of out of electric power.

CITATION LIST

Patent Literature

PTL 1: JP2011-193547A

SUMMARY

In such an electric vehicle, a controlling lower limit value is set in a range relatively larger than a value 0, with a view to suppressing deterioration of the power storage device from being accelerated due to over-discharge. When the electric vehicle is unable to reach at least one of the main charging facility and the sub charging facility in the ordinary drive mode, the electric vehicle described above controls the load group to reduce the amount of power consumption of the load group. When the state of charge of the power storage device reaches the controlling lower limit value (fixed value), the electric vehicle terminates driving and is likely to fail to reach a charging facility in service.

An electric vehicle of the present disclosure mainly aims to increase the possibility that the electric vehicle is able to reach a charging facility in service.

Solution to Problem

In order to achieve the above primary object, the electric vehicle of the disclosure is implemented by an aspect described below.

The present disclosure is directed to an electric vehicle. The electric vehicle includes a motor for driving, a power storage device configured to transmit electric power to and from the motor, and a control device configured to control the motor and to set a first rate to a controlling lower limit rate of the power storage device. When it is expected that the electric vehicle is unable to reach an operating charging facility which is a charging facility in service, with keeping the controlling lower limit rate to the first rate, the control device changes the controlling lower limit rate to a second rate that is lower than the first rate.

When it is expected that the electric vehicle is unable to reach the operating charging facility which is the charging facility in service, with keeping the controlling lower limit rate of the power storage device to the first rate, the electric vehicle of this aspect changes the controlling lower limit rate to the second rate that is lower than the first rate. When it is expected that the electric vehicle is unable to reach the operating charging facility with keeping the controlling lower limit rate to the first rate, this configuration extends the remaining driving distance until the state of charge of the power storage device reaches the controlling lower limit rate and thereby increases the possibility that the electric vehicle is able to reach the operating charging facility.

DESCRIPTION OF EMBODIMENTS

The following describes aspects of the present disclosure with reference to some embodiments.

Figure 1:
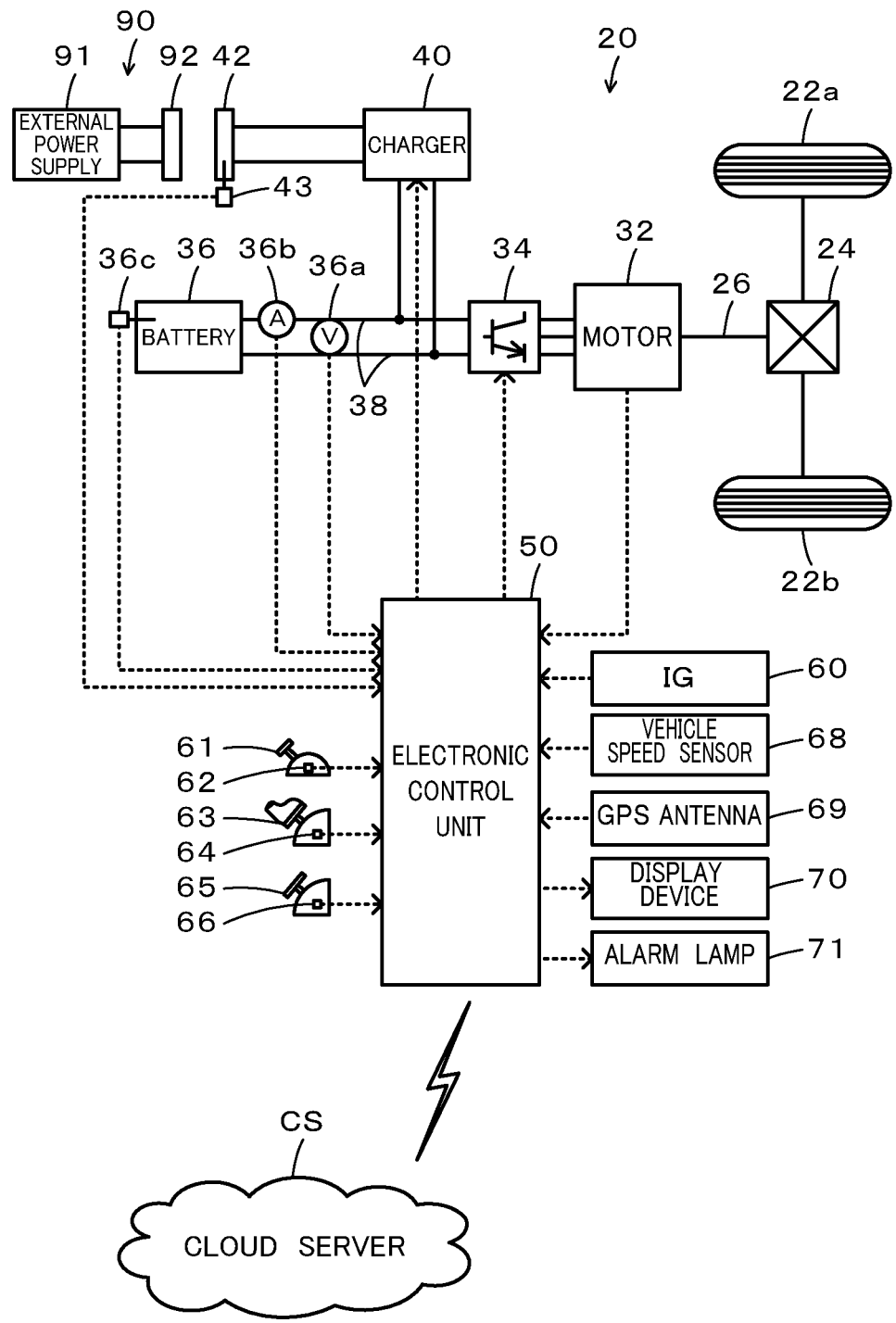
FIG. 1 is a configuration diagram illustrating the schematic configuration of an electric vehicle according to an embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 36 as a power storage device, a charger 40, and an electronic control unit 50.

The motor 32 is configured as, for example, a synchronous generator motor and includes a rotor that is connected with a driveshaft 26 which is coupled with drive wheels 22a and 22b via a differential gear 24. The inverter 34 is used to drive the motor 32 and is connected with the battery 36 via power lines 38. The electronic control unit 50 performs switching control of a plurality of switching elements (not shown) included in the inverter 34, so as to rotate and drive the motor 32. The battery 36 is configured as, for example, a lithium ion rechargeable battery or a nickel metal hydride battery.

The charger 40 is connected with the power lines 38 and is configured to charge the battery 36 using electric power from an external power supply 91 such as a household power supply or an industrial power supply in a charging facility 90 when a vehicle-side connector 42 is connected with an facility-side connector 92 of the external power supply 91, for example, at home or at a charging station. This charger 40 is controlled by the electronic control unit 50.

The electronic control unit 50 is configured as a CPU-based microprocessor and includes a ROM configured to store processing programs, a RAM configured to temporarily store data, input/output ports and a communication port, in addition to the CPU, although not being illustrated.

Signals from various sensors are input into the electronic control unit 50 via the input port. The signals input into the electronic control unit 50 include, for example, a rotational position θm of the rotor of the motor 32 from a rotational position sensor (not shown) configured to detect the rotational position of the rotor of the motor 32 and phase currents Iu, Iv and Iw of the respective phases of the motor 32 from a current sensor (not shown) configured to detect the phase currents of the respective phases of the motor 32. The input signals also include a voltage Vb of the battery 36 from a voltage sensor 36a placed between terminals of the battery 36, an electric current Ib of the battery 36 from a current sensor 36b mounted to an output terminal of the battery 36, and a temperature Tb of the battery 36 from a temperature sensor 36c mounted to the battery 36. The input signals further include a connection detection signal from a connection detection sensor 43 that is mounted to the vehicle-side connector 42 and that is configured to detect connection of the vehicle-side connector 42 with the facility-side connector 92. The input signals also include an ignition signal from an ignition switch 60 and a shift position SP from a shift position sensor 62 configured to detect an operating position of a shift lever 61. The input signals additionally include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, a vehicle speed V from a vehicle speed sensor 68, and a current location of the vehicle from a GPS antenna 69.

Various controls signals are output from the electronic control unit 50 via the output port. The signals output from the electronic control unit 50 include, for example, control signals to the inverter 34, a control signal to the charger 40, a control signal to a display device 70 configured to display information, and a control signal to an alarm lamp 71.

The electronic control unit 50 calculates a state of charge SOC of the battery 36, based on an integrated value of the electric current Ib of the battery 36 input from the current sensor 36b, and also calculates a controlling allowable output Wout that is allowed to be output from the battery 36, based on the calculated state of charge SOC and the temperature Tb of the battery 36 from the temperature sensor 36c. The state of charge SOC denotes a ratio of the capacity of electric power dischargeable from the battery 36 to the overall capacity of the battery 36. The electronic control unit 50 also calculates an electric power consumption Ev that is a driving distance per unit amount of electric power, based on a driving history.

The electronic control unit 50 is also configured to communicate with a cloud server CS by wireless communication. The cloud server CS is configured to be communicable with respective vehicles including the electric vehicle 20 by wireless communication and stores map information and driving history information of the respective vehicles therein. The map information includes service information (for example, information regarding the locations and the operating hours (business hours) of facilities, parking places, and charging facilities) and road information of predetermined respective driving intervals (for example, intervals between traffic lights and intervals between intersections). The road information includes distance information, road width information, number of lanes information, district information (urban or suburban), road type information (general road, expressway, toll road), slope information, legal speed limits, and the number of signals. The driving history information includes, for example, a driving route and the date and time of each past driving, a parking position and the date and time of parking.

In the electric vehicle 20 of the embodiment having the above configuration, the electronic control unit 50 sets a required torque Td* that is required for driving (i.e., that is required for the driveshaft 26), based on the accelerator position Acc and the vehicle speed V. The electronic control unit 50 also sets a controlling allowable torque Tmax of the motor 32 by dividing the controlling allowable power Wout of the battery 36 by a rotation speed Nm of the motor 32, and sets a torque command Tm* of the motor 32 by guarding the required torque Td* with the controlling allowable torque Tmax as the upper limit. The electronic control unit 50 performs switching control of the plurality of switching elements included in the inverter 34, such as to drive the motor 32 with the torque command Tm*.

When the state of charge SOC of the battery 36 becomes equal to or lower than a controlling lower limit rate Smin, the electronic control unit 50 stops driving the motor 32 to a ready-off state, with a view to protecting the battery 36. A method of setting the controlling lower limit rate Smin will be described later. When the state of charge SOC of the battery 36 becomes equal to or lower than a predetermined rate Slo (for example, 10%, 12% or 15%), the electronic control unit 50 lights up the alarm lamp 71 to inform the user of the possibility of ready-off due to a decrease in state of charge SOC to the controlling lower limit rate Smin.

In the electric vehicle 20 of the embodiment, in response to connection of the vehicle-side connector 42 with the facility-side connector 92 during parking at home or at a charging station (more specifically, in response to detection of a connection of these connectors 42 and 92 by the connection detection sensor 43), the electronic control unit 50 controls the charger 40 to charge the battery 36 with electric power from the external power supply 91 and stops driving the charger 40 when the state of charge SOC of the battery 36 reaches a predetermined rate Smax. In the description below, such charging of the battery 36 with electric power from the external power supply 91 is called "external charging". The predetermined rate Smax used may be, for example, 90%, 95% or 100%.

Figure 2:
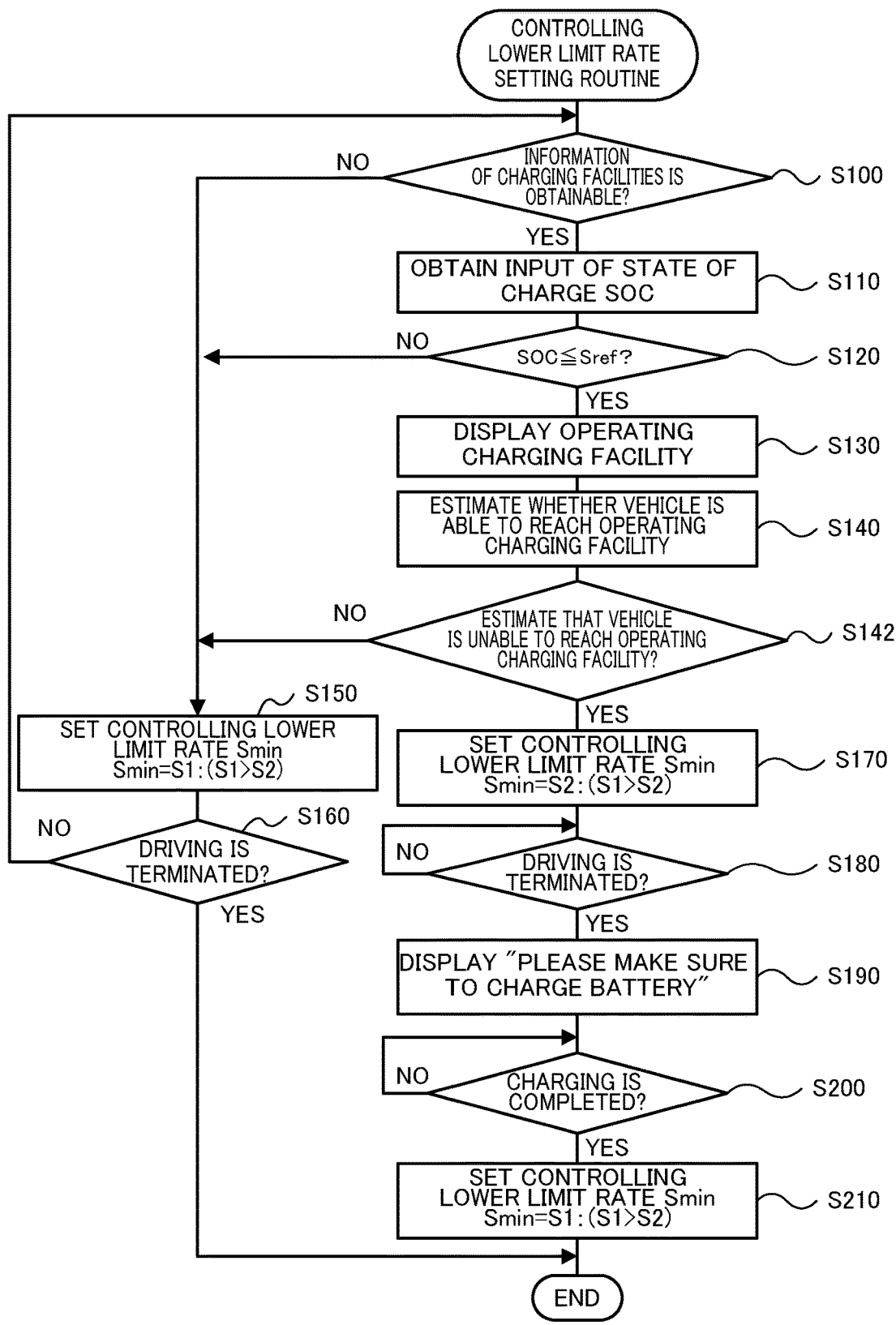
FIG. 2 is a flowchart showing one example of a controlling lower limit rate setting routine performed by an electronic control unit.

The following describes the operations of the electric vehicle 20 of the embodiment having the above configuration or more specifically a series of operations to set the controlling lower limit rate Smin of the battery 36. FIG. 2 is a flowchart showing one example of a controlling lower limit rate setting routine performed by the electronic control unit 50. This routine is performed when driving is started (more specifically, when the ignition switch 60 is turned on).

When the controlling lower limit rate setting routine of FIG. 2 is triggered, the electronic control unit 50 first determines whether information of charging facilities (locations and operating hours) is obtainable from the cloud server CS (step S100). This determination may be, for example, based on determination of whether the electronic control unit 50 is allowed to make communication with the cloud server CS.

When it is determined at step S100 that the information of the charging facilities is obtainable from the cloud server CS, the electronic control unit 50 obtains the input of the state of charge SOC of the battery 36 (step S110) and compares the input state of charge SOC of the battery 36 with a reference value Sref (step S120). The reference value Sref is a value approximate to the predetermined rate Slo described above, for example, a value identical with the predetermined rate Slo, a value lower by 1% or 2% than the predetermined rate Slo or a value higher by 1% or 2% than the predetermined rate Slo.

When the state of charge SOC of the battery 36 is higher than the reference value Sref at step S120, the electronic control unit 50 sets an ordinary predetermined value S1 to the controlling lower limit rate Smin of the battery 36 (step S150) and determines whether driving is terminated (more specifically, whether the ignition switch 60 is turned off) (step S160). The predetermined value S1 is determined as a relatively low value (for example, a lower limit value) in a range that does not accelerate deterioration of the battery 36 due to over-discharge and may be, for example, 4%, 5% or 6%. When it is determined that driving is not to be stopped, the electronic control unit 50 returns to step S100. When it is determined that driving is to be stopped, on the other hand, the electronic control unit 50 terminates this routine.

When the state of charge SOC of the battery 36 is equal to or lower than the reference value Sref at step S120, on the other hand, the electronic control unit 50 searches for an operating charging facility that is a charging facility in service, based on the current location of the vehicle from the GPS antenna 69 and the information of the charging facilities (locations and operating hours) from the cloud server CS and displays the operating charging facility on the display device 70 (step S130). The electronic control unit 50 subsequently estimates whether the electric vehicle 20 is able to reach the operating charging facility with keeping the controlling lower limit rate Smin of the battery 36 at the predetermined value S1 (steps S140 and S142). When it is estimated that the electric vehicle 20 is able to reach the operating charging facility with keeping the controlling lower limit rate Smin of the battery 36 at the predetermined value S1, the electronic control unit 50 performs the processing of and after step S150.

According to the embodiment, the operating charging facility is a nearest operating charging facility. The estimation process of steps S140 and S142 may, for example, compare an allowable driving distance Ltd at the controlling lower limit value Smin kept to the predetermined value S1 with a distance Lch to the nearest operating charging facility. The allowable driving distance Ltd may be calculated by multiplying an amount of electric power Wb dischargeable from the battery 36 until the state of charge SOC of the battery 36 reaches the predetermined value S1, by the electric power consumption Ev. The amount of electric power Wb may be calculated, for example, by multiplying a difference between the state of charge SOC of the battery 36 and the predetermined value S1 by a conversion factor k (factor used to convert the state of charge into the amount of electric power). The electric power consumption Ev used may be a value calculated based on the driving history.

When it is estimated at steps S140 and S142 that the electric vehicle 20 is unable to reach the operating charging facility with keeping the controlling lower limit rate Smin of the battery 36 at the predetermined value S1, on the other hand, the electronic control unit 50 sets a predetermined value S2 that is lower than the predetermined value S1, to the controlling lower limit rate Smin of the battery 36 or in other words, changes the controlling lower limit rate Smin from the predetermined value S1 to the predetermined value S2 (step S170). The predetermined value S2 used may be, for example, 1%, 2% or 3%. This increases the possibility that the electric vehicle 20 is able to reach the operating charging facility.

When driving is terminated (step S180), the electronic control unit 50 displays a message such as "Please make sure to charge the battery" on the display device 70 and inform the driver of the necessity of external charging (charging of the battery 36 with electric power from the external power supply 91 of the charging facility 90) (step S190). When external charging is performed and is then completed (step S200), the electronic control unit 50 sets the predetermined value S1 to the controlling lower limit rate Smin of the battery 36 or in other words, returns the controlling lower limit rate Smin of the battery 36 from the predetermined value S2 to the predetermined value S1 (step S210) and then terminates this routine. This suppresses the state of charge SOC of the battery 36 from becoming lower than the predetermined value S1 in a next drive (trip).

When it is determined at step S100 that the information of the charging facilities is not obtainable from the cloud server CS, the electronic control unit 50 performs the processing of and after step S150. When the information of the charging facilities (especially, information of the operating hours) is not obtainable, it is unknown whether a charging facility is in service (i.e., whether the battery 36 is allowed to be charged at the charging facility) until the vehicle actually reaches the charging facility. According to the embodiment, the electronic control unit 50 thus keeps the controlling lower limit rate Smin of the battery 36 at the predetermined value S1. Deterioration of the battery 36 is accelerated when the battery 36 is left with the state of charge SOC lower than the predetermined value S1 (i.e., without external charging). This suppresses the state of charge SOC of the battery 36 from becoming lower than the predetermined value S1 and thereby suppresses deterioration of the battery 36 from being accelerated.

As described above, when it is estimated that the electric vehicle 20 is unable to reach the operating charging facility with keeping the controlling lower limit rate Smin of the battery 36 at the predetermined value S1, the electric vehicle 20 of the embodiment changes the controlling lower limit rate Smin of the battery 36 from the predetermined value S1 to the predetermined value S2 that is lower than the predetermined value S1. This increases the possibility that the electric vehicle 20 is able to reach the operating charging facility.

When it is estimated that the electric vehicle 20 is unable to reach the operating charging facility with keeping the controlling lower limit rate Smin of the battery 36 at the predetermined value S1, the electric vehicle 20 of the embodiment changes the controlling lower limit rate Smin of the battery 36 from the predetermined value S1 to the predetermined value S2. According to a modification, the controlling lower limit rate Smin of the battery 36 may be changed to a variable value S2va that is lower than the predetermined value S1, in place of the predetermined value S2 (fixed value). For example, the variable value S2va used may be a value that tends to increase (i.e., approach the predetermined value S1) with an increase in frequency of changing the controlling lower limit rate Smin of the battery 36 from the predetermined value S1 to the variable value S2va in a past trip. This aims to suppress deterioration of the battery 36 from being accelerated due to over-discharge. In another example, the variable value S2va used may be a value obtained by guarding an estimated state of charge SOCes that is estimated as the state of charge SOC of the battery 36 when the electric vehicle reaches the operating charging facility, with the above predetermined value S2 as a lower limit. This suppresses the controlling lower limit rate Smin from being excessively decreased (i.e., decreases the controlling lower limit rate Smin by only a value needed). Additionally, when the estimated state of charge SOCes is lower than the predetermined value S2, a modification may use, as the variable value S2va, a value that is lower than the predetermined value S1 but is higher than the predetermined value S2 to such an extent that the electric vehicle is movable to a safe location such as a road shoulder and may display a message such as "It is expected that the electric vehicle is unable to reach a charging facility. Please park the vehicle in a safe location such as a road shoulder" on the display device 70.

When the information (locations and operating hours) of the charging facilities is obtainable from the cloud server CS, the electric vehicle 20 of the embodiment searches for an operating charging facility, based on the current location of the vehicle and the information of the charging facilities from the cloud server CS. When the electric vehicle is equipped with a vehicle-mounted navigation system that stores map information (information including locations and operating hours of charging facilities) similar to that stored in the cloud server CS, a modification may search for an operating charging facility, based on the current location of the vehicle and the information (locations and operating hours) of the charging facilities from the vehicle-mounted navigation system. When the information of the charging facilities is obtainable by communication with the respective charging facilities, a modification may search for an operating charging facility, based on the current location of the vehicle and the information from the respective charging facilities.

The electric vehicle 20 of the embodiment displays the nearest operating charging facility on the display device 70 and estimates whether the electric vehicle 20 is able to reach the nearest operating charging facility with keeping the controlling lower limit rate Smin of the battery 36 at the predetermined value S1. A modification may display at least one operating charging facility (including the nearest operating charging facility) surrounding the current location on the display device 70. When no destination (target operating charging facility) is set by the user among the operating charging facilities displayed on the display device 70, the modification may estimate whether the electric vehicle is able to reach the nearest operating charging facility with keeping the controlling lower limit rate Smin of the battery 36 at the predetermined value S1. When a destination is set by the user, the modification may estimate whether the electric vehicle is able to reach the destination with keeping the controlling lower limit rate Smin of the battery 36 at the predetermined value S1.

The electric vehicle 20 of the embodiment displays the operating charging facility on the display device 70 when the state of charge SOC of the battery 36 becomes equal to or lower than the reference value Sref. A modification may display the operating charging facility on the display device 70, irrespective of the state of charge SOC of the battery 36. Another modification may not display the operating charging facility on the display device 70.

When driving is terminated at the controlling lower limit rate Smin of the battery 36 equal to the predetermined value S2, the electric vehicle 20 of the embodiment displays the message such as "Please make sure to charge the battery" on the display device 70 and thereby informs the driver of the necessity of external charging. A modification may inform the driver of the necessity of external charging by audio output from a vehicle-mounted speaker. Another modification may not inform the driver of the necessity of external charging.

The electric vehicle 20 is equipped with the charger 40 that is configured to charge the battery 36 with electric power from the external power supply 91 when the vehicle-side connector 42 is connected with the facility-side connector 92. According to a modification, the electric vehicle may be equipped with a charger that is configured to receive electric power from an external power supply in a contactless manner and charge the battery 36, in addition to or in place of the charger 40.

The electric vehicle 20 of the embodiment uses the battery 36 as the power storage device. The power storage device may be a capacitor, in place of the battery 36.

In the electric vehicle of the above aspect, when operation information of the charging facility is not obtainable, the control device may keep the controlling lower limit rate at the first rate. When the operation information of charging facilities is not obtainable, it is unknown whether a charging facility is in service (i.e., whether the power storage device is allowed to be charged at the charging facility) until the vehicle actually reaches the charging facility. Deterioration of the power storage device is accelerated when the power storage device is left with the state of charge lower than the first rate. The configuration that keeps the controlling lower limit rate to the first rate when the operating information of the charging facility is not obtainable suppresses the state of charge of the power storage device from becoming lower than the first rate and thereby suppresses deterioration of the power storage device from being accelerated. "When the operating information of the charging facility is not obtainable" is mentioned when the electric vehicle fails to make communication with a vehicle exterior system (for example, a cloud server or each charging facility).

In the electric vehicle of the above aspect, when the power storage device is charged with electric power from an external power supply after a change of the controlling lower limit rate to the second rate, the control device may return the controlling lower limit rate to the first rate. This configuration suppresses the state of charge of the power storage device from becoming lower than the first rate in a next drive.

In the electric vehicle of the above aspect, when a state of charge of the power storage device becomes equal to or lower than a third rate that is higher than the first rate, the control device may inform of the operating charging facility. This configuration enables the user to recognize the operating charging facility.

In the electric vehicle of the above aspect, when driving is terminated with the controlling lower limit rate equal to the second rate, the control device may inform of necessity of charging of the power storage device with electric power from an external power supply. This configuration enables the user to recognize the necessity of charging of the power storage device with electric power from the external power supply.

The following describes the correspondence relationship between the primary elements of the above embodiment and the primary elements of the disclosure described in Summary. The motor 32 of the embodiment corresponds to the "motor", the battery 36 corresponds to the "power storage device", and electronic control unit 50 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The aspects of the present disclosure are applicable to, for example, manufacturing industries of electric vehicles.

The invention claimed is:

1. An electric vehicle, comprising:
    a motor for driving;
    a battery configured to transmit electric power to and from the motor; and
    an electric control unit including a processor programmed to:
       control the motor; and
       set a first controlling lower limit rate of the transmission of power from the battery, wherein
       when the electronic control unit determines that the electric vehicle is unable to reach an operating charging facility that is in service while maintaining the first controlling lower limit rate, the electronic control unit is further programmed to change the first controlling lower limit rate to a second controlling lower limit rate that is lower than the first controlling lower limit rate, and
       change the second controlling lower limit rate back to the first controlling lower limit rate when the battery is charged from the external power supply.

2. The electric vehicle according to claim 1, wherein the electronic control unit is further programmed to maintain the first controlling lower limit rate when the processor is unable to obtain operation information of the charging facility.

3. The electric vehicle according to claim 2, wherein the electric control unit is further programmed to change the second controlling lower limit rate back to the first controlling lower limit rate when the battery is charged from the external power supply.

4. The electric vehicle according to claim 1, wherein the electronic control unit is further programmed to inform a user of an operating charging facility when a state of charge of the battery becomes equal to our lower than a third controlling lower limit rate, that is higher than the first controlling lower limit rate.

5. The electric vehicle according to claim 1, wherein the electronic control unit is further programmed to notify a user when the battery needs to be charged from an external power supply when a controlling lower limit rate is equal to the second controlling lower limit rate.

* * * * *